US012716038B2

(12) United States Patent
Nierode et al.

(10) Patent No.: US 12,716,038 B2
(45) Date of Patent: Aug. 25, 2026

(54) PROCESSES AND SYSTEMS FOR UPGRADING A HYDROCARBON

(71) Applicant: ExxonMobil Chemical Patents Inc., Baytown, TX (US)

(72) Inventors: Mark A. Nierode, Kingwood, TX (US); James L. Kendall, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 448 days.

(21) Appl. No.: 18/547,269

(22) PCT Filed: Mar. 4, 2022

(86) PCT No.: PCT/US2022/018896
§ 371 (c)(1),
(2) Date: Aug. 21, 2023

(87) PCT Pub. No.: WO2022/211970
PCT Pub. Date: Oct. 6, 2022

(65) Prior Publication Data

US 2024/0318090 A1 Sep. 26, 2024

Related U.S. Application Data

(60) Provisional application No. 63/169,157, filed on Mar. 31, 2021.

(51) Int. Cl.

| | |
|---|---|
| ***C10G 9/36*** | (2006.01) |
| ***B01D 53/04*** | (2006.01) |
| ***B01D 53/14*** | (2006.01) |
| ***C10G 70/04*** | (2006.01) |
| ***C10G 70/06*** | (2006.01) |

(52) U.S. Cl.
CPC ........... *C10G 70/046* (2013.01); *B01D 53/04* (2013.01); *B01D 53/1493* (2013.01); *C10G 9/36* (2013.01); *C10G 70/06* (2013.01); *B01D 2251/60* (2013.01); *B01D 2252/103* (2013.01); *B01D 2252/204* (2013.01); *B01D 2256/24* (2013.01); *B01D 2257/304* (2013.01); *B01D 2257/306* (2013.01); *B01D 2257/308* (2013.01); *B01D 2259/4009* (2013.01); *C10G 2300/207* (2013.01)

(58) Field of Classification Search
CPC .. C10G 70/046; C10G 9/36; C10G 2300/207; B01D 2257/306; B01D 2257/308
See application file for complete search history.

(56) References Cited

U.S. PATENT DOCUMENTS

| | | | | |
|---|---|---|---|---|
| 3,398,208 | A | 8/1968 | Ward | |
| 3,974,256 | A * | 8/1976 | Wheelock | C10K 1/20 95/135 |
| 4,002,720 | A | 1/1977 | Wheelock et al. | |
| 2009/0127164 | A9 | 5/2009 | Baudot et al. | |
| 2016/0046874 | A1* | 2/2016 | Smith, Jr. | F25J 3/0247 422/187 |

FOREIGN PATENT DOCUMENTS

| | | |
|---|---|---|
| WO | 2016/011171 | 1/2016 |

OTHER PUBLICATIONS

Wong Louise et al; "*Decarbonisation Options for Large Volume Organic Chemicals Production, Shell Moerdijk*", Manufacturing Industry Decarbonisation Data Exchange Network; Nov. 9, 2020.

* cited by examiner

*Primary Examiner* — Randy Boyer
(74) *Attorney, Agent, or Firm* — WOMBLE BOND DICKINSON (US) LLP; Kevin Davis

(57) ABSTRACT

Processes and systems for upgrading a hydrocarbon. In some embodiments, the process for upgrading a hydrocarbon, can include contacting a gas that can include one or more $C_1$-$C_4$ hydrocarbons and carbonyl sulfide with a sorbent under conditions sufficient to cause at least a portion of the carbonyl sulfide to sorb onto the sorbent to produce a treated gas lean in carbonyl sulfide and a sorbent rich in carbonyl sulfide. The process can also include contacting the sorbent rich in carbonyl sulfide with a regenerating gas that can include molecular hydrogen, one or more $C_1$-$C_4$ hydrocarbons, or a mixture thereof to produce a regenerated sorbent and a desorb effluent that can include a sulfur-based contaminant. The process can also include introducing at least a portion of the desorb effluent into a pyrolysis zone of a steam cracker and recovering a steam cracker effluent from the pyrolysis zone.

16 Claims, 2 Drawing Sheets

100
101
103
105
106
107
109
121
180
175
176
177
178
165
166
167
168
169
170
171
172
173
110
111
112
113
114
115
116
117
118
119
120
122
124
126
128
129
130
131
133
135
137
139
141
143
145
147
148
149
150
151
155
156
157
158
159
160
161
162
163
182
185
187
189
190

PROCESSES AND SYSTEMS FOR UPGRADING A HYDROCARBON

CROSS-REFERENCE TO RELATED APPLICATIONS

This application is a US national phase application of PCT Application Serial No. PCT/US2022/018896 having a filing date of Mar. 4, 2022, which claims priority to and the benefit of U.S. Provisional Application No. 63/169,157 having a filing date of Mar. 31, 2021, the disclosures of both of which are incorporated herein by reference in their entireties.

FIELD

Embodiments disclosed herein generally relate to processes and systems for upgrading a hydrocarbon. More particularly, such processes and systems relate to removing sulfur-based contaminants from a process and/or a refinery gas.

BACKGROUND

Pyrolysis processes, e.g., steam cracking, convert saturated hydrocarbons, e.g., alkanes, to higher-value products, e.g., light olefins such as ethylene and propylene. A pyrolysis effluent recovered from the steam cracker, especially for heavier hydrocarbon feeds, typically includes one or more sulfur-based contaminants, e.g., carbonyl sulfide, hydrogen sulfide, mercaptans, and the like. Similarly, refinery gas recovery processes often produce a refinery process gas containing sulfur-based contaminants that need to be removed therefrom.

Conventional processes for removing sulfur from process and refinery gases include adsorbing the sulfur contaminants onto an absorbent. Once the absorbent becomes saturated the adsorbent can be regenerated by contacting the saturated absorbent with a heated tail or fuel gas to produce a desorb effluent that includes the tail or fuel gas and the sulfur-based contaminants. Disposal of the desorb effluent can lead to short term increases in sulfur emissions, e.g., SOx, when burned in a furnace, e.g., a steam cracker furnace. The increase in sulfur emissions may not be acceptable depending on the amount of sulfur and local permit regulations that set a limit for the release of sulfur-based contaminants into the atmosphere.

There is a need, therefore, for improved processes and systems for removing sulfur-based contaminants from process and/or refinery gases.

SUMMARY

Processes and systems for upgrading a hydrocarbon are provided. In some embodiments, the process can include contacting a gas that can include one or more $C_1$-$C_4$ hydrocarbons and carbonyl sulfide with a sorbent under conditions sufficient to cause at least a portion of the carbonyl sulfide to sorb onto the sorbent to produce a treated gas lean in carbonyl sulfide and a sorbent rich in carbonyl sulfide. The process can also include contacting the sorbent rich in carbonyl sulfide with a regenerating gas that can include molecular hydrogen, one or more $C_1$-$C_4$ hydrocarbons, or a mixture thereof to produce a regenerated sorbent and a desorb effluent comprising a sulfur-based contaminant. The process can also include introducing at least a portion of the desorb effluent into a pyrolysis zone of a steam cracker. The process can also include recovering a steam cracker effluent from the pyrolysis zone.

In other embodiments, the process for upgrading a hydrocarbon can include contacting a gas that can include one or more $C_1$-$C_4$ hydrocarbons and carbonyl sulfide with a sorbent under conditions sufficient to cause at least a portion of the carbonyl sulfide to sorb onto the sorbent to produce a treated gas lean in carbonyl sulfide and a sorbent rich in carbonyl sulfide. The process can also include contacting the sorbent rich in carbonyl sulfide with a regenerating gas that can include one or more $C_1$-$C_4$ hydrocarbons to produce a regenerated sorbent and a desorb effluent comprising a sulfur-based contaminant. The process can also include combusting at least a portion of the desorb effluent in the presence of an oxidant to produce a combustion effluent that can include one or more sulfur oxides. The process can also include contacting at least a portion of the combustion effluent with an aqueous inorganic base to produce an exhaust effluent lean in sulfur-based contaminants and a spent aqueous inorganic base. In some embodiments, the gas that can include the one or more $C_1$-$C_4$ hydrocarbons and carbonyl sulfide can be separated from a steam cracker effluent. In other embodiments, heat produced during combustion of the desorb effluent can heat a radiant section of a steam cracker furnace. In still other embodiments, the gas that can include the one or more $C_1$-$C_4$ hydrocarbons and carbonyl sulfide can be separated from a steam cracker effluent and heat produced during combustion of the desorb effluent can heat a radiant section of a steam cracker furnace.

In other embodiments, the process for upgrading a hydrocarbon can include contacting a gas that can include one or more $C_1$-$C_4$ hydrocarbons and carbonyl sulfide with a sorbent under conditions sufficient to cause at least a portion of the carbonyl sulfide to sorb onto the sorbent to produce a treated gas lean in carbonyl sulfide and a sorbent rich in carbonyl sulfide. The process can also include contacting the sorbent rich in carbonyl sulfide with a regenerating gas that can include one or more $C_1$-$C_4$ hydrocarbons to produce a regenerated sorbent and a desorb effluent that can include hydrogen sulfide, carbonyl sulfide, one or more mercaptans, or a mixture thereof. The process can also include combining the desorb effluent with a process gas separated from a steam cracker effluent to produce a mixed effluent. The process can also include contacting at least a portion of the mixed effluent with a basic aqueous medium under conditions sufficient to remove at least a portion of any hydrogen sulfide, at least a portion of any carbonyl sulfide, at least a portion of any one or more mercaptans, or a combination thereof to produce a process water rich in sulfur and a treated effluent lean in hydrogen sulfide, carbonyl sulfide, the one or more mercaptans, or a combination thereof.

In other embodiments, the process for upgrading a hydrocarbon can include contacting a gas that can include one or more $C_1$-$C_4$ hydrocarbons, carbonyl sulfide, and optionally acetylene with a sorbent under conditions sufficient to cause at least a portion of the carbonyl sulfide to sorb onto the sorbent to produce a treated gas lean in carbonyl sulfide and a sorbent rich in carbonyl sulfide. The gas can be separated from a stream cracker effluent. The process can also include contacting the sorbent rich in carbonyl sulfide with a regenerating gas that can include one or more $C_1$-$C_4$ hydrocarbons to produce a regenerated sorbent and adsorb effluent comprising hydrogen sulfide, carbonyl sulfide, one or more mercaptans, or a mixture thereof. The process can also include contacting at least a portion of the desorb effluent with a disposable medium to produce a disposable medium rich in hydrogen sulfide, rich in carbonyl sulfide, rich in one or more mercaptans, or rich in a mixture thereof. The process can also include disposing of at least a portion of the hydrogen sulfide rich disposable medium.

In other embodiments, the process for upgrading a hydrocarbon can include contacting a gas that can include one or more $C_1$-$C_4$ hydrocarbons and carbonyl sulfide with a sorbent under conditions sufficient to cause at least a portion of the carbonyl sulfide to sorb onto the sorbent to produce a first gas lean in carbonyl sulfide and a first sorbent rich in carbonyl sulfide. The process can also include contacting the sorbent rich in carbonyl sulfide with a first regenerating gas that can include one or more $C_1$-$C_4$ hydrocarbons to produce a first regenerated sorbent and a first desorb effluent that can include one or more sulfur-based contaminants. The process can also include combusting at least a portion of the desorb effluent in the presence of an oxidant to produce a combustion effluent. At least a portion of the combustion effluent can heat a radiant section of a steam cracker furnace, a boiler, or a combination thereof. The process can also include exhausting the combustion gas to the atmosphere. The process can also include determining a reduction in sulfur-based contaminants is needed. The process can also include contacting additional gas that can include the one or more $C_1$-$C_4$ hydrocarbons and carbonyl sulfide with the regenerated sorbent under conditions sufficient to cause at least a portion of the carbonyl sulfide to sorb onto the regenerated sorbent to produce a second gas lean in carbonyl sulfide and a second sorbent rich in carbonyl sulfide. The process can also include contacting the second carbonyl sulfide rich sorbent with a second regenerating gas that can include one or more $C_1$-$C_4$ hydrocarbons to produce a second regenerated sorbent and a second desorb effluent that can include one or more sulfur-based contaminants. The process can also include introducing at least a portion of the desorb effluent into a pyrolysis zone of a steam cracker.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
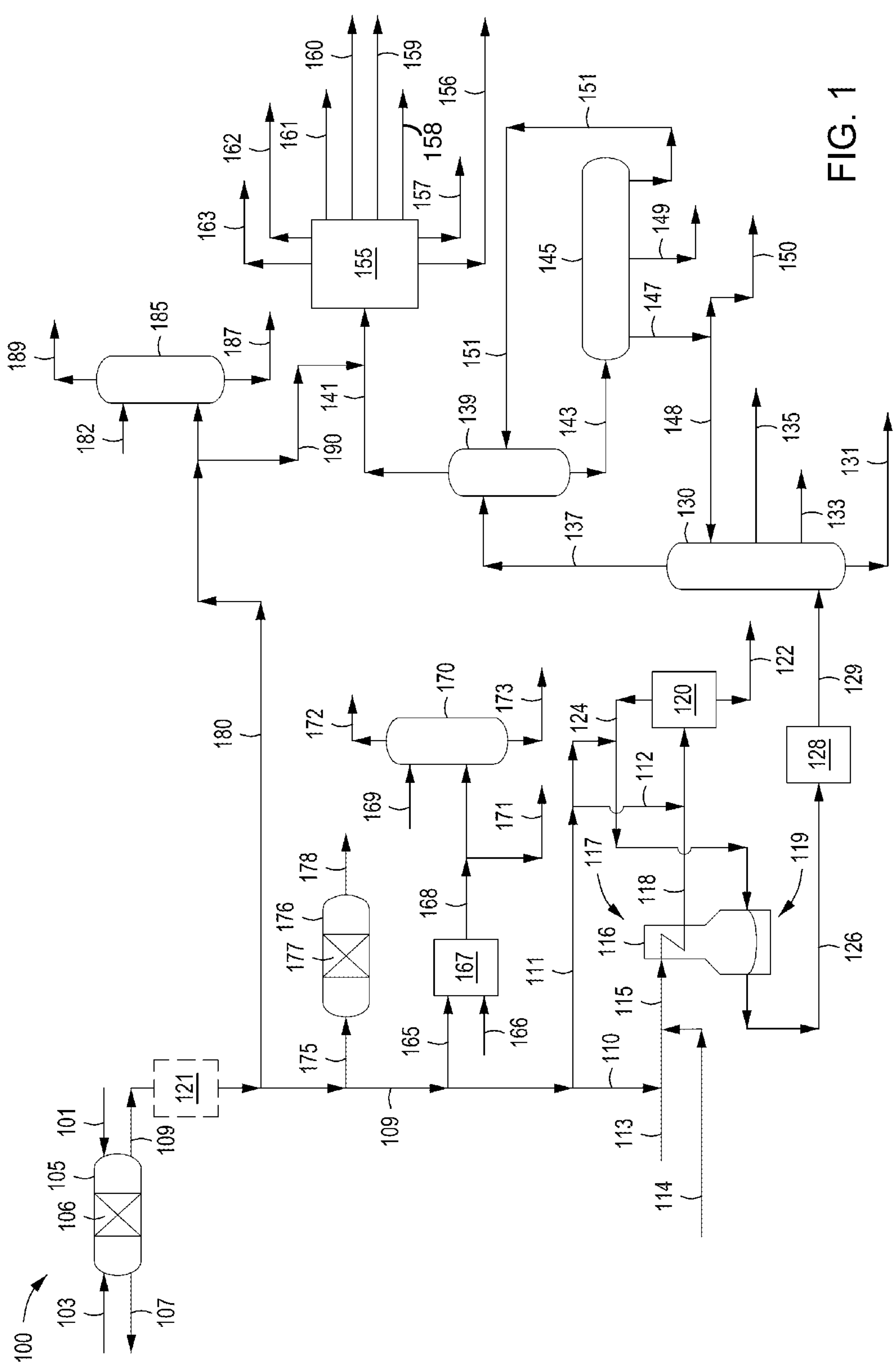
FIG. 1 depicts a schematic of an illustrative system for processing a desorb effluent that includes one or more sulfur-based contaminants, according to one or more embodiments described.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

The indefinite article "a" or "an", as used herein, means "at least one" unless specified to the contrary or the context clearly indicates otherwise. Thus, embodiments using "a separator" include embodiments where one or two or more separators are used, unless specified to the contrary or the context clearly indicates that only one separator is used. Likewise, embodiments using "a separation stage" include embodiments where one or two or more separation stages are used, unless specified to the contrary.

Definitions

The terms "refinery gas" and "refinery off gas" are used interchangeably and refer to a gaseous stream recovered from a refinery facility that upgrades one or more hydrocarbons via any upgrading process except for steam cracking. Refinery facilities that can produce the refinery gas include, but are not limited to, hydrocarbon upgrading processes that include fluidized catalytic cracking, coking, hydrocracking, hydrotreating, isomerization, reforming, decoking, hydrocarbon combustion, hydrocarbon distillation, hydrocarbon unsaturation, and hydrocarbon saturation processes. The term "process gas" refers to a gaseous stream recovered from a steam cracker effluent in a steam cracker facility.

As used herein, the term "hydrocarbon" means a class of compounds containing hydrogen bound to carbon. The term "$C_n$" hydrocarbon means hydrocarbon having n carbon atom(s) per molecule, where n is a positive integer. The term "$C_{n+}$" hydrocarbon means hydrocarbon having at least n carbon atom(s) per molecule, where n is a positive integer. The term "$C_{n-}$" hydrocarbon means hydrocarbon having no more than n number of carbon atom(s) per molecule, where n is a positive integer. "Hydrocarbon" encompasses (i) saturated hydrocarbon, (ii) unsaturated hydrocarbon, and (iii) mixtures of hydrocarbons, including mixtures of hydrocarbon compounds (saturated and/or unsaturated), including mixtures of hydrocarbon compounds having different values of n.

The term "unsaturate" or "unsaturated hydrocarbon" means a $C_{2+}$ hydrocarbon containing at least one carbon atom directly bound to another carbon atom by a double or triple bond. The term "olefin" means an unsaturated hydrocarbon containing at least one carbon atom directly bound to another carbon atom by a double bond. In other words, an olefin is a compound that contains at least one pair of carbon atoms, where the first and second carbon atoms of the pair are directly linked by a double bond. "Light olefin" means $C_{5-}$ olefinic hydrocarbon.

The term "primarily liquid phase" means a composition of which ≥50 wt. % is in the liquid phase, e.g., ≥75 wt. %, such as ≥90 wt. %. A hydrocarbon feedstock is a primarily liquid-phase hydrocarbon feedstock when ≥50 wt. % of the hydrocarbon feedstock is in the liquid phase at a temperature of 25° C. and a pressure of 1 bar absolute, e.g., ≥75 wt. %, such as ≥90 wt. %.

The term "raw" feedstock, e.g., raw hydrocarbon feedstock, means a primarily liquid-phase feedstock that comprises ≥25 wt. % of crude oil that has not been subjected to prior desalting and/or prior fractionation with reflux, e.g., ≥50 wt. %, such as ≥75 wt. %, or ≥90 wt. %.

The term "crude oil" means a mixture comprising naturally-occurring hydrocarbon of geological origin, where the mixture (i) comprises ≥1 wt. % of resid, e.g., ≥5 wt. %, such as ≥10 wt. %, and (ii) has an API gravity ≤52°, e.g., ≤30°, such as ≤20°, or ≤10°, or <8°. The crude oil can be classified by API gravity, e.g., heavy crude oil has an API gravity in the range of from 5° up to (but not including) 22°.

Normal boiling point and normal boiling point ranges can be measured by gas chromatograph distillation according to the methods described in ASTM D-6352-98 or D2887, as extended by extrapolation for materials above 700° C. The term "$T_{50}$" means a temperature, determined according to a boiling point distribution, at which 50 weight percent of a particular sample has reached its boiling point. Likewise, "$T_{90}$", "$T_{95}$" and "$T_{98}$" mean the temperature at which 90, 95, or 98 weight percent of a particular sample has reached its boiling point. Nominal final boiling point means the temperature at which 99.5 weight percent of a particular sample has reached its boiling point.

Certain medium and/or heavy hydrocarbons, e.g., certain raw hydrocarbon feedstocks, such as certain crude oils and crude oil mixtures contain one or more of asphaltenes, precursors of asphaltenes, and particulates. Asphaltenes are described in U.S. Pat. No. 5,871,634. Asphaltene content can be determined using ASTM D6560-17. Asphaltenes in the hydrocarbon can be in the liquid phase (e.g., a miscible liquid phase), and also in a solid and/or semi-solid phase (e.g., as a precipitate). Asphaltenes and asphaltene precursors are typically present in a crude oil's resid portion. "Resid" means an oleaginous mixture, typically contained in or derived from crude oil, the mixture having a normal boiling point range ≥1050° F. (566° C.). Resid can include "non-volatile components", meaning compositions (organic and/or inorganic) having a normal boiling point range ≥590° C. Non-volatile components may be further limited to components with a boiling point of about 760° C. or greater. Non-volatile components may include coke precursors, which are moderately heavy and/or reactive molecules, such as multi-ring aromatic compounds, which can condense from the vapor phase and then form coke under the specified steam cracking conditions. Medium and/or heavy hydrocarbons (particularly the resid portion thereof) may also contain particulates, meaning solids and/or semi-solids in particle form. Particulates may be organic and/or inorganic, and can include coke, ash, sand, precipitated salts, etc. Although precipitated asphaltenes may be solid or semi-solid, precipitated asphaltenes are considered to be in the class of asphaltenes, not in the class of particulates.

Hydrocarbon Upgrading

FIG. 1 depicts a schematic of an illustrative system 100 for processing a desorb effluent in line 109 that includes one or more sulfur-based contaminants, according to one or more embodiments. While multiple embodiments of this disclosure are illustrated and in FIG. 1 and described below, it should be understood that that the processes of this disclosure are not required to contain all embodiments, process steps, or equipment shown in FIG. 1 and described below. Certain embodiments of this disclosure may include only a portion of the equipment and process steps illustrated in FIG. 1. A gas that includes one or more $C_1$-$C_4$ hydrocarbons and carbonyl sulfide (COS) and optionally an alkyn (e.g., acetylene, $C_2H_2$), and optionally a mercaptan (e.g., methyl mercaptan, $CH_3SH$) can be introduced via line 101 into a carbonyl sulfide removal stage 105 and contacted with a sorbent 106 therein. The gas in line 101 can be a process gas (or a separated portion such as a fraction thereof) recovered from a steam cracker effluent, a refinery gas, or a mixture thereof. In some embodiments, the gas in line 101 can be or can include, but is not limited to, molecular hydrogen, one or more $C_1$-$C_5$ alkanes, one or more $C_2$-$C_5$ alkenes, or a mixture thereof. In some embodiments, the gas in line 101 can include $C_{5+}$ hydrocarbons, e.g., $C_5$-$C_9$ hydrocarbons. The sorbent 106 can sorb at least a portion of the carbonyl sulfide and at least portion of the optional mercaptan, if any, to produce a treated gas lean in carbonyl sulfide and the optional mercaptan via line 107 and a sorbent 106 rich in carbonyl sulfide and the optional mercaptan. Suitable sorbents 106 can be or can include, but are not limited to, commercially available sorbents such as SELEXSORB® available from BASF and AXSORB® 980/984 available from Axens.

When the ability of the sorbent 106 to sorb a sufficient amount of carbonyl sulfide from the gas in line 101 becomes insufficient, introduction of the gas via line 101 can be stopped and the sorbent 106 can be regenerated by contacting the sorbent 106 with a regenerating gas introduced via line 103 into the carbonyl sulfide removal stage 105 to produce a regenerated sorbent 106 and the desorb effluent via line 109. The regenerating gas in line 103 can be at a temperature of about 90° C., about 93° C., about 100° C., about 125° C., about 150° C., or about 175° C. to about 225° C., about 250° C., about 275° C., about 300° C., about 315° C., or about 350° C. when contacted with the sorbent 106. The regenerating gas in line 103 can be or can include, but is not limited to, molecular hydrogen, one or more $C_1$-$C_4$ alkanes, or a mixture thereof. In certain preferred embodiments the regenerating gas in line 103 can comprise one or more of methane, ethane, propane, and butanes, preferably ethane, propane, and/or butanes separated from the process gas. In some embodiments, the regenerating gas in line 103 can be or can include molecular hydrogen, one or more $C_1$-$C_4$ alkanes, or a mixture thereof, and <10 mol %, <7 mol %, <5 mol %, <3 mol %, or <1 mol % of any alkenes. In some embodiments, the regeneration gas in line 103 can be or can include, but is not limited to, a treated gas or a fraction thereof as discussed in more detail below, an imported gas from a source located off site from the system 100, or a combination thereof.

The desorb effluent in line 109 can include one or more sulfur-based contaminants. The sulfur-based contaminant can be or can include, but is not limited to, carbonyl sulfide, hydrogen sulfide, a mercaptan, or a mixture thereof. It has been discovered that at least a portion of the carbonyl sulfide sorbed by the sorbent 106 from the gas in line 101 can be converted in the desorbing process and become hydrogen sulfide and/or one or more mercaptans in the desorb effluent in line 109. At least a portion of the desorb effluent in line 109 can be subjected to one or more additional process steps as further described below. In some embodiments, additional gas that includes the one or more $C_1$-$C_4$ hydrocarbons and carbonyl sulfide can be contacted with the regenerated sorbent 106 in the carbonyl sulfide removal stage 105 under conditions sufficient to cause at least a portion of the carbonyl sulfide to sorb onto the regenerated sorbent to produce additional treated gas lean in carbonyl sulfide and additional sorbent rich in carbonyl sulfide. In some embodiments, the desorb effluent in line 109 can optionally be introduced into one or more fines separation stages 121. The optional fines separation stage 121 can be or can include one or more knockout drums, one or more filters, one or more coalescers, or a combination thereof to remove at least a portion of any fines that may be present in the desorb effluent to produce a desorb effluent in line 109 that can be lean in fines.

In some embodiments, at least a portion of the desorb effluent (or the desorb effluent lean in fines) via lines 109 and 110 can be combined with a hydrocarbon-containing feed in line 113 and steam introduced via line 114 to produce a mixture via line 115. The mixture in line 115 can be heated within a convection section 117 of a steam cracker 116 to produce a heated mixture in line 118. The heated mixture via line 118 can be introduced into a separation stage 120 from which a liquid phase product via line 122 and a vapor phase product via line 124 can be recovered. The vapor phase product via line 124 can be introduced into a radiant section or pyrolysis zone 119 of the steam cracker 116. In other embodiments, at least a portion of the desorb effluent (or the desorb effluent lean in fines) via lines 109, 111, and 112 can be combined with the heated mixture of the hydrocarbon-containing feed and steam in line 118 and introduced into the separation stage 120. It should be understood that the separation stage 120 is optional and can be excluded such that the heated mixture in line 118 can be introduced directly into the radiant section or pyrolysis zone 119 of the steam cracker 116. As such, in some embodiments, at least a portion of the desorb effluent via lines 109 and 110 can be combined with the hydrocarbon-containing feed in line 113 and the steam in line 114 to produce the mixture in line 115 and/or at least a portion of the desorb effluent via lines 109, 111, and 112 can be combined with the heated mixture in line 118 and introduced directly into the radiant section or pyrolysis zone 119 of the steam cracker 116.

In other embodiments, at least a portion of the desorb effluent (or the desorb effluent lean in fines) via lines 109 and 111 can be combined with the vapor phase product in line 124 to produce a mixture that can be introduced into the radiant section or pyrolysis zone 119 of the steam cracker 116 to produce the steam cracker effluent via line 126. In other embodiments, at least a portion of the desorb effluent via lines 109 and 110 can be combined with the hydrocarbon containing feed in line 113 and the steam in line 114 to produce the mixture in line 115 and at least a portion of the desorb effluent via lines 109 and 111 can be combined with the vapor phase product in line 124 and/or at least a portion of the desorb effluent via lines 109, 111, and 112 can be combined with the heated mixture of the hydrocarbon-containing feed and steam in line 118.

The vapor phase product via line 124 or the heated mixture of the hydrocarbon-containing feed, steam, and desorb effluent in line 118 can be introduced into the radiant section or pyrolysis zone 119 of the steam cracker 116 to produce a steam cracker effluent via line 126. The vapor phase product or heated mixture can be at a temperature of ≥400° C., e.g., a temperature of about 425° C. to about 825° C., and subjected to steam cracking conditions within the radiant section or pyrolysis zone 119 of the steam cracker 116 to produce the steam cracker effluent in line 126. The liquid phase product in line 122 can be subjected to one or more additional upgrading processes well-known in the art. In some examples, the hydrocarbon feed separation stage and upgrading of the liquid phase product can be or can include those disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; 6,632,351; 7,578,929; 7,235,705; and 8,158,840.

The hydrocarbon-containing feed in line 113 can be or can include, but is not limited to, raw crude oil, desalted crude oil, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, atmospheric pipestill bottoms, vacuum pipestill streams such as vacuum pipestill bottoms and wide boiling range vacuum pipestill naphtha to gas oil condensates, heavy non-virgin hydrocarbons from refineries, vacuum gas oils, heavy gas oil, naphtha contaminated with crude, atmospheric residue, heavy residue, a C4/residue admixture, naphtha/residue admixture, hydrocarbon gases/residue admixture, hydrogen/residue admixtures, waxy residues, gas oil/residue admixture, relatively light alkanes, e.g., ethane, propane, butane, pentane, or a mixture thereof, fractions thereof, or any mixture thereof. In at least some embodiments, the hydrocarbon-containing feed in line 113 can be or can include, but is not limited to, naphtha, gas oil, vacuum gas oil, a waxy residue, an atmospheric residue, a crude oil, a fraction thereof, or a mixture thereof. In some embodiments, if a raw crude oil or other hydrocarbon that includes salts will be steam cracked, the raw crude oil or other hydrocarbon can optionally be subjected to pretreatment, e.g., desalting, to remove at least a portion of any salts contained in the raw crude oil or other hydrocarbon before heating the hydrocarbon-containing feed and steam and optionally the desorb effluent to produce the heated mixture in line 118. In some embodiments, the hydrocarbon-containing feed in line 113 can be primarily composed of relatively light hydrocarbons such as $C_2$ to $C_8$ alkanes. Suitable hydrocarbon feeds can also be or include the hydrocarbons or hydrocarbon feeds disclosed in U.S. Pat. Nos. 7,993,435; 8,277,639; 8,696,888; 9,327,260; 9,637,694; 9,657,239; and 9,777,227; and International Patent Application Publication No. WO 2018/111574.

The steam cracking conditions within the radiant section or pyrolysis zone 119 of the steam cracker 116 can include, but are not limited to, one or more of: exposing the heated mixture to a temperature (as measured at a radiant outlet of the steam cracker 116) of ≥400° C., e.g., a temperature of about 700° C., about 800° C., or about 900° C. to about 950° C., about 1,000° C., or about 1050° C., a pressure of about 0.1 bar to about 5 bars (absolute), and/or a steam cracking residence time of about 0.01 seconds to about 5 seconds. In some examples, the heated mixture in line 124 can be steam cracked according to the processes and systems disclosed in U.S. Pat. Nos. 6,419,885; 7,993,435; 9,637,694; and 9,777,227; U.S. Patent Application Publication No. 2018/0170832; and International Patent Application Publication No. WO 2018/111574.

The steam cracker effluent in line 126 can be at a temperature of ≥300° C., ≥400° C., ≥500° C., ≥600° C., or ≥700° C., or ≥800° C., or more. The steam cracker effluent in line 126 can be cooled to produce a cooled steam cracker effluent. For example, the steam cracker effluent in line 126 can be directly contacted with an optional quench fluid and/or indirectly cooled via one or more heat exchangers, e.g., a transfer line exchanger "TLE", in a heat exchange stage 128 to produce a cooled steam cracker effluent via line 129.

The steam cracker effluent in line 126 can include sulfur obtained from the desorb effluent at least partly as hydrogen sulfide. In some embodiments, ≥50 wt %, ≥60 wt %, ≥70 wt %, ≥80 wt %, ≥90 wt %, ≥95 wt %, ≥99 wt %, substantially all, i.e., >99 wt %, or all of any carbonyl sulfide and/or any mercaptan in the desorb effluent in line 109 can be converted to hydrogen sulfide within the radiant section or pyrolysis zone 119 of the steam cracker 116.

As shown, the cooled steam cracker effluent via line 129 can be introduced into a separation stage, e.g., a primary fractionator, 130. The cooled stream cracker effluent can be separated within the separation stage 130 to provide a bottoms or tar product via line 131, the steam cracker quench oil via line 133, the steam cracker gas oil via line 135, and an overhead product that includes a steam cracker naphtha and a process gas via line 137. In some embodiments, the cooled steam cracker effluent via line 129 can be introduced into one or more separation stages, e.g., a tar knock out drum, to separate a tar product and a light product therefrom, with the light product then introduced into the separation stage 130. Suitable separation stages the cooled steam cracker effluent in line 129 can be introduced to can include those disclosed in U.S. Pat. No. 7,674,366; 7,718,049; 8,083,931; 8,092,671; 8,105,479.

The overhead product via line 137 can be introduced into a quench tower 139 along with quench water, e.g., a recycled quench water, via line 151 to cool the overhead product in line 137. An overhead or process gas via line 141 can be recovered and a mixture that includes steam cracker naphtha and quench water via line 143 can be conducted away from the quench tower 139. The process gas in line 141 can include molecular hydrogen and $C_1$-$C_{5+}$ hydrocarbons, e.g., $C_1$-$C_9$ hydrocarbons. In some embodiments, the process gas in line 141 can be or can include, but is not limited to, molecular hydrogen, one or more $C_1$-$C_5$ alkanes, one or more $C_2$-$C_5$ alkenes, and one or more contaminants, or a mixture thereof. It should be understood that while shown as being separate vessels the quench tower 139 can be integrated with the separation stage 130.

The mixture of steam cracker naphtha and quench water in line 143 can be introduced into one or more separators 145. The steam cracker naphtha via line 147, quench water via line 149, and recycle quench water via line 151 can be conducted away from the separator 145. The quench water via line 149 can be removed from the system, e.g., introduced into a wastewater treatment process, sent to a sour water stripper, dilution steam generation system, etc. In some embodiments, the recycle quench water in line 151 can be cooled, e.g., by air and/or water, and recycled to the quench tower 139. In some examples, the recycle quench water via line 151 can be recycled to the quench tower 139 as a single return and/or split into multiple returns to the quench tower 139 and/or other process equipment.

A portion of the steam cracker naphtha via lines 147 and 150 can be removed from the system 100. A portion of the steam cracker naphtha via lines 147 and 148 can be recycled to the separation stage 130 as a reflux. The steam cracker naphtha in line 147 can have a final boiling point of ≤260° C., as measured according to ASTM D2887-18. In some embodiments, the steam cracker naphtha can have a final boiling point of about 220° C., about 221° C., about 225° C., or about 230° C. to about 235° C., about 240° C., about 245° C., about 250° C., or about 255° C. In some embodiments, the amount of steam cracker gas oil via line 135 conducted away from the separation stage 130 can be controlled or adjusted to maintain recovery of a steam cracker naphtha in line 147 that has a final boiling point of ≤260° C., as measured according to ASTM D2887-18. The amount of steam cracker naphtha recycled via lines 147 and 148 relative to the cooled steam cracker effluent introduced via line 129 into the separation stage 130 can be adjusted or controlled to provide a desired temperature and/or liquid loading within the separation stage 130.

Steam crackers, separation stages, other equipment, and process conditions are well-known. Suitable steam crackers, separation stages, process gas recovery configurations, other equipment, and process conditions can include those disclosed in U.S. Patent Nos. 6,419,885; 7,560,019; 7,993,435; 8,105,479; 8,197,668; 8,882,991; 8,894,844; 9,637,694; 9,777,227; U.S. Patent Application Publication Nos.: 2014/0061096; 2014/0357923; 2016/0376511; 2018/0170832; 2019/0016975; and WO Publication No.: WO 2018/111574.

The process gas via line 141 can be introduced into a recovery facility 155 that can process the gas to remove one or more impurities therefrom and can provide a plurality of gas streams. In some embodiments, a gasoline product via line 156, a $C_4$ hydrocarbon stream via line 157, propane via line 158, propylene via line 159, ethane via line 160, ethylene via line 161, methane via line 162, and molecular hydrogen via line 163 can be recovered from the recovery facility 155. In some embodiments, the regenerating gas introduced via line 103 into the carbonyl sulfide removal stage 105 to produce the regenerated sorbent 106 and the desorb effluent via lines 109 and 165 can be or can include, but is not limited to, the molecular hydrogen in line 163, methane in line 162, ethane in line 160, propane in line 158, and/or butane separated from the $C_4$ hydrocarbon stream in line 157, or a mixture thereof. In other embodiments, at least a portion of the desorb effluent in line 103 can be an imported gas from a source located off site from the system 100.

In other embodiments, the desorb effluent (or the desorb effluent lean in fines) via lines 109 and 165, or a portion thereof, and an oxidant via line 166 can be introduced into one or more combustors 167 to produce a combustion effluent via line 168. The combustor 167 can be or can include, but is not limited to, the combustor used to produce the combustion gas that heats the radiant section or pyrolysis zone 119 of the steam cracker 116, one or more boilers, one or more incinerators, or a combination thereof. As such, in some embodiments, the combustion effluent in line 168 can be recovered from the steam cracker 116. The desorb effluent can be combusted in the presence of the oxidant to produce a combustion effluent that can include one or more sulfur oxides in line 168. The oxidant can be or can include, but is not limited to, air, air diluted with an inert gas ($N_2$, e.g.), oxygen, oxygen diluted with an inert gas ($N_2$, e.g.), ozone, or any mixture thereof. The one or more sulfur oxides can be or can include monoxide (SO), sulfur dioxide ($SO_2$), sulfur trioxide ($SO_3$), sulfur sesquioxide ($S_2O_3$), sulfur heptoxide ($S_2O_7$), sulfur tetroxide ($SO_4$) or a mixture thereof. In some embodiments, a supplemental fuel can be introduced into the combustor 167 and combusted in the presence of the oxidant to produce additional heat if desired.

The combustion effluent via line 168 and an aqueous inorganic base via line 169 can be introduced into a caustic tower 170. The combustion effluent can be contacted with an aqueous inorganic base such as with an aqueous hydroxide solution, e.g., sodium hydroxide, to produce a treated gas lean in sulfur oxides via line 172 and a spent aqueous inorganic base via line 173.

In other embodiments, the desorb effluent (or the desorb effluent lean in fines) via lines 109 and 175, or a portion thereof, can be introduced into a contactor 176 and contacted with a disposable medium 177 to produce a disposable medium rich in one or more sulfur based compounds, e.g., carbonyl sulfide, hydrogen sulfide, one or more mercaptans, or a mixture thereof, and a treated effluent lean in the sulfur based compound(s) via line 178. In some embodiments, if the gas via line 101 includes acetylene, e.g., in addition to one or more $C_1$-$C_4$ hydrocarbons and carbonyl sulfide, the desorb effluent in lines 109 and 175 can be substantially free of the acetylene. In some embodiments, the disposable medium 177 can be or can include, but is not limited to, lead oxide, copper oxide, zinc oxide, or a combination thereof. When a rate of sorption of the disposable medium 177 falls to an unsatisfactory level, the disposable medium can be replaced and the used disposable medium can be properly disposed of.

In other embodiments, the desorb effluent (or the desorb effluent lean in fines) via lines 109 and 180, or a portion thereof, and an basic aqueous medium via line 182 can be introduced into one or more contactors 185, e.g., an amine tower, a caustic tower, or both an amine tower and a caustic tower. The desorb effluent and the basic aqueous medium can be mixed or otherwise contacted within the contactor 185 under conditions sufficient to remove at least a portion of any hydrogen sulfide, at least a portion of any carbonyl sulfide, at least a portion of any one or more mercaptans, or a combination thereof to produce a process water rich in sulfur via line 187 and a treated effluent lean in hydrogen sulfide, carbonyl sulfide, one or more mercaptans, or a combination thereof via line 189. In some embodiments, the basic aqueous medium can be or can include, but is not limited to, a lean solution of one or more light amines. In other embodiments, the basic aqueous medium can be or can include, but is not limited to, an aqueous hydroxide solution, e.g., sodium hydroxide. We have surprisingly discovered that at least a portion of the COS sorbed by the sorbent 106 from the gas in line 101 can be converted in the desorbing process and become hydrogen sulfide and/or one or more mercaptans present in the desorb effluent in line 109. Thus, in cases where the gas in line 101 comprises hydrogen sulfide and mercaptans a low concentrations (e.g., substantially free of $H_2S$ and mercaptans) and comprise COS at a relatively high concentration, and the sorbent 106 thus becomes rich in COS, the desorb effluent 109 may nonetheless comprise $H_2S$ and/or mercaptants at appreciable concentrations. By contacting the desorb effluent or a portion thereof with a basic aqueous medium (e.g., the amine solution and/or caustic solution used for treating the process gas), one can effectively abate at least a substantial portion of the $H_2S$ and mercaptans from the desorb effluent, which originated from COS in the gas in line 101.

In other embodiments, the desorb effluent (or the desorb effluent lean in fines) via lines 109, 180, and 190, or a portion thereof, can be introduced into the recovery facility 155. For example, the desorb effluent via lines 109, 180, and 190 can be mixed, blended, or otherwise combined with the process gas in line 141 to produce a mixed effluent in line 141 that can be introduced into the recovery facility 155.

In other embodiments, a process for upgrading a hydrocarbon can include contacting the gas in line 101 that can be or can include, but is not limited to, one or more $C_1$-$C_4$ hydrocarbons and carbonyl sulfide with the sorbent 106 under conditions sufficient to cause at least a portion of the carbonyl sulfide to sorb onto the sorbent 106 to produce a first gas lean in carbonyl sulfide via line 107 and a first sorbent rich in carbonyl sulfide. The sorbet rich in carbonyl sulfide 106 can be contacted with a first regenerating gas introduced via line 103 that can be or can include, but is not limited to, one or more $C_1$-$C_4$ hydrocarbons to produce a first regenerated sorbent 106 and a first desorb effluent via line 109 that can include one or more sulfur-based contaminants. In some embodiments, the first regenerating gas can be or can include a tail gas that can include molecular hydrogen, methane, and <5 mol % (e.g., ≤3 mol %, ≤1 mol %) of $C_2$-$C_4$ hydrocarbons.

In some embodiments, at least a portion of the desorb effluent (or the desorb effluent lean in fines) via lines 109 and 165 and an oxidant via line 165 can be introduced into the combustor 167 to produce the combustion effluent via line 168. In some embodiments, at least a portion of the combustion effluent can heat the radiant section or pyrolysis zone 119 of the stream cracker 116, another furnace, a boiler, or a combination thereof. In some embodiments, at least a portion of the combustion gas via lines 168 and 171 can be exhausted to the atmosphere. It should be understood, that if heat from the combustion gas in line 167 heats the pyrolysis zone 199 of the steam cracker 116, another furnace, a boiler, or a combination thereof, the combustion gas can be routed to such equipment and then exhausted to the atmosphere.

In some embodiments, it can be determined that a reduction in sulfur-based contaminants introduced into the atmosphere can be needed. In such embodiment, the process can further include contacting additional gas in line 101 with the regenerated sorbent under conditions sufficient to cause at least a portion of the carbonyl sulfide to sorb onto the regenerated sorbent to produce a second gas lean in carbonyl sulfide via line 107 and a second sorbent rich in carbonyl sulfide 106. The second carbonyl sulfide rich sorbent can be contacted with a second regenerating gas that can be or can include, but is not limited to one or more $C_1$-$C_4$ hydrocarbons to produce a second regenerated sorbent 106 and a second desorb effluent via line 109 comprising one or more sulfur-based contaminants. In some embodiments, the second regenerating gas can include ≥50 mol % (e.g., ≥60 mol %, ≥70 mol %, ≥80 mol %, ≥90 mol %) of $C_2$-$C_4$ hydrocarbons. At least a portion of the desorb effluent (or the desorb effluent lean in fines) via lines 109 and 110, via lines 109 and 111, and/or via lines 109, 111, and 112 can be combined with the hydrocarbon-containing feed and steam to produce the mixture in line 115, the heated mixture in line 118, and/or the overhead in line 124 and can be introduced into the radiant section or pyrolysis zone 119 of the steam cracker 116 as described above.

Figure 2:
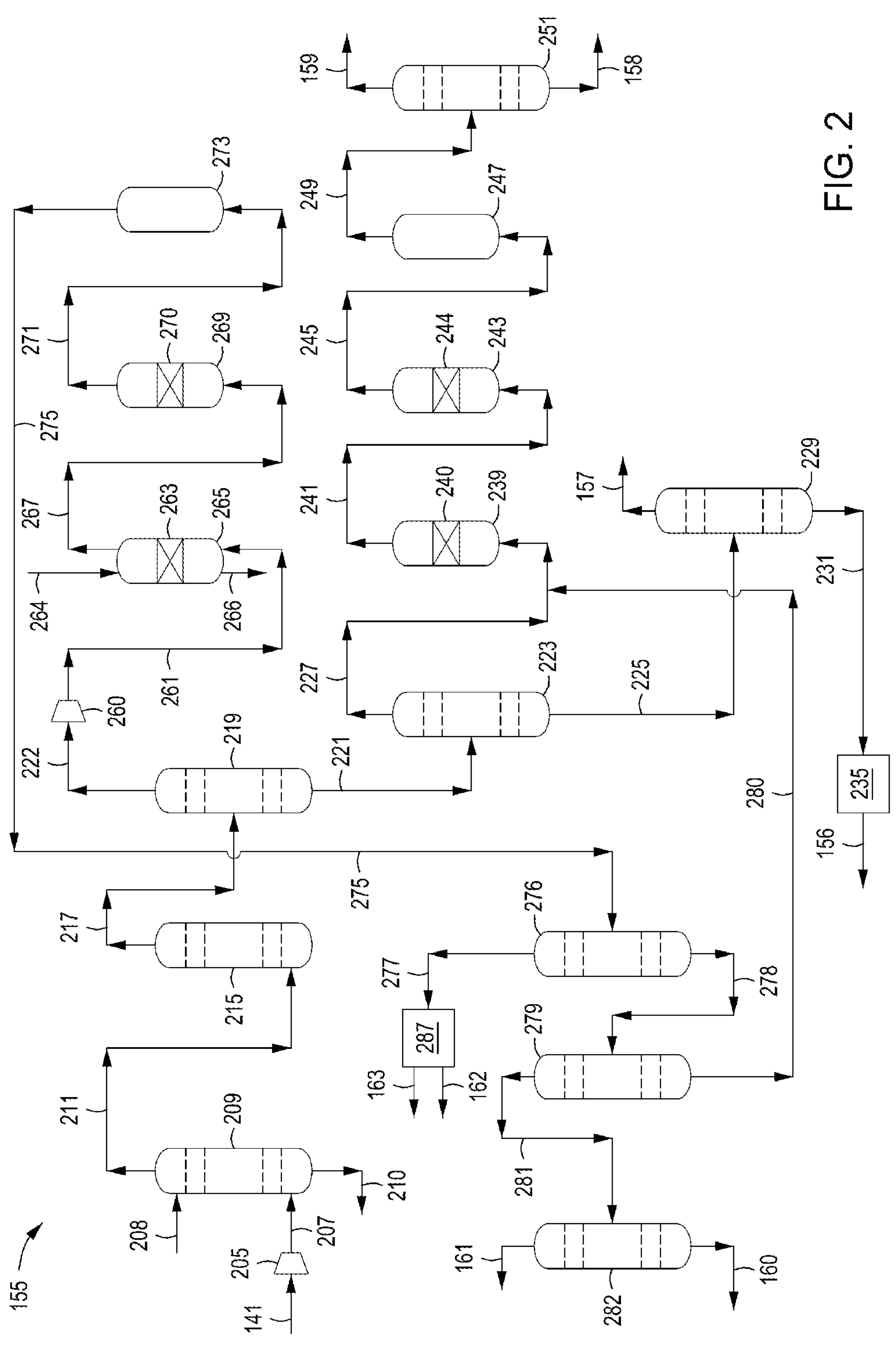
FIG. 2 depicts a schematic of an illustrative recovery facility for separating process gas, according to one or more embodiments described.

FIG. 2 depicts a schematic of an illustrative recovery facility 155 for processing and separating the process gas in line 141, according to one or more embodiments. The process gas via line 141 can be introduced into a compressor 205 to produce a compressed gas via line 207. The compressor 205 can be a multi-stage compressor that can include any number of compression stages, such as 2, 3, 4, 5, 6, or more. It should be understood that the compressor 205, if a multi-stage compressor, can also include one or more cooling stages between any two compression stages to cool the compressed fluid exiting one stage before the compressed fluid enters the next stage. It should also be understood that at least a portion of any water, if present, can be removed from the process gas in line 141 during compression thereof.

The compressed gas via line 207 can be introduced into an amine tower 209 for purification, e.g., by removing hydrogen sulfide and/or other acidic gases. The amine tower can also receive a lean solution of one or more light amines via line 208. At least a portion of any acid gases in the combined gas can be transferred to the lean amine solution to produce a rich amine solution that can be conducted away via line 210. A treated gas via line 211 can be introduced into a caustic tower 215 for additional treatment, such as with an aqueous hydroxide solution, e.g., sodium hydroxide, to further reduce the content of any acidic gases in the combined gas. An upgraded gas can be conducted away via line 217 from the caustic tower 215.

The upgraded gas via line 217 can be introduced into a separation stage 219 that can separate a bottoms stream via line 221 and an overhead stream via line 222. The bottoms stream in line 221 can include $C_{3+}$ hydrocarbons and the overhead stream in line 222 can include molecular hydrogen, $C_1$-$C_2$ hydrocarbons (possibly with some $C_{3+}$ hydrocarbons). It should be understood that the invention is not limited to the embodiment illustrated by FIG. 2. As such, this description should not be interpreted as excluding other embodiments within the broad scope of the invention, such as embodiments in which (i) the overhead stream in line 222 includes methane and molecular hydrogen and the bottoms stream in line 221 includes $C_{2+}$ hydrocarbons or (ii) the overhead stream in line 222 includes molecular hydrogen and $C_{3-}$ hydrocarbons and the bottoms stream in line 221 includes $C_{4+}$ hydrocarbons. Accordingly, those skilled in the art will appreciate that various separations and upgrading process configurations can be arranged in many different configurations within the scope of the present invention in addition to the embodiment illustrated by FIG. 2.

The bottoms stream via line 221 can be introduced into a separation stage 223 that can separate a bottoms stream via line 225 and an overhead stream via line 227. The bottoms stream in line 225 can include $C_{4+}$ hydrocarbons and the overhead stream in line 227 can include $C_3$ hydrocarbons. The bottoms stream via line 225 can be introduced into a separation stage 229 that can separate a bottoms stream via line 231 and a $C_4$ hydrocarbon stream via line 157. The bottoms stream in line 231 can include $C_{5+}$ hydrocarbons. The bottoms stream via line 231 can be introduced into a gasoline hydrogenation unit 235 to produce various gasoline products that can be recovered via line 156. In some embodiments, the $C_4$ hydrocarbon stream can be introduced into one or more separators to produce a butane stream and one or more additional $C_4$ streams. In some embodiments, extractive distillation, adsorptive separation, and other well-known separation processes.

The overhead in line 227 that includes the $C_3$ hydrocarbons can be conducted to further processing stages that can include, but are not limited to, (i) a methanol/carbonyl sulfide removal bed 240 disposed within a carbonyl sulfide removal stage 239, then through line 241 to (ii) an arsine removal bed 244 disposed within an arsine removal stage 243, and then through line 245 to (iii) a methyl acetylene and propadiene (MAPD) converter 247, and then through line 249 to (iv) a $C_3$ separation stage, e.g., a fractionator, 251 for separation of propylene via line 159 and propane via line 158. The carbonyl sulfide removal bed 240 can include any suitable sorbent or combination thereof. Suitable sorbents can be or can include, but are not limited to, commercially available sorbents such as SELEXSORB® available from BASF and AXSORB® 980/984 available from Axens. In some embodiments, the propane in line 158 can be recycled to the steam cracker 116 (FIG. 1) for cracking, used in a refinery process, used as or as a component of the regeneration gas in line 103 (FIG. 1) and/or in line 264 (discussed in more detail below), and/or recovered as a product.

The overhead via line 222 can be introduced into a compressor 260 for additional compression. The compressor 260 can include a single compression stage or can be a multi-stage compressor that can be the same as or similar to the multi-stage compressor 205. From the compressor 260 a stream via line 261 that includes compressed molecular hydrogen, methane, and $C_2$ hydrocarbons (possibly with some $C_{3+}$ hydrocarbons) can be introduced into a series of purification stages that can include, but are not limited to, (i) a mercaptan and carbonyl sulfide removal bed 263 disposed within a carbonyl sulfide removal stage 265, then through line 267 to (ii) an arsine removal bed 270 disposed within an arsine removal stage 269, then through line 271 to (iii) an acetylene converter 273. The carbonyl sulfide removal bed 263 can include any suitable sorbent or combination thereof. Suitable sorbents can be or can include, but are not limited to, commercially available sorbents such as SELEXSORB® available from BASF and AXSORB® 980/984 available from Axens. A purified stream via line 275 that can include molecular hydrogen, methane, ethane, ethylene, some $C_{3+}$ hydrocarbons, or a mixture thereof can be introduced into a separation stage 276. The separation stage 276 can separate from the purified stream in line 275 at least (i) a first stream via line 277 that can include molecular hydrogen and methane and (ii) a second stream via line 278 that can include $C_2$ hydrocarbons that can be transferred to a separation stage 279. The separation stage 279 can separate from the second stream (i) any residual $C_{3+}$ hydrocarbons, e.g., for recycle, via line 280 to line 227 that feeds the methanol/carbonyl sulfide removal bed 239 and (ii) a stream via line 281 that includes purified $C_2$ hydrocarbons.

The carbonyl sulfide removal bed 263 can be periodically regenerated by introducing a regenerating gas via line 264 into the carbonyl sulfide removal stage 265 and contacting the sorbent rich in carbonyl sulfide to produce a regenerated sorbent and a desorb effluent that can include one or more sulfur based contaminants that can be recovered via line 266. The regenerating gas can be or can include, but is not limited to, molecular hydrogen, one or more $C_1$-$C_4$ alkanes, or a mixture thereof. In some embodiments, the regenerating gas in line 264 can be recovered from the combined gas in the recovery facility 155. For example, the regenerating gas can include (i) molecular hydrogen in line 162, (ii) methane in line 162, (iii) ethane in line 160, (iv) propane in line 158, (v) butane separated from the $C_4$ hydrocarbon in line 157, or (vi) any mixture of two or more of (i) to (v). In some embodiments, the regenerating gas can contain <5 mol % of any alkenes. In other embodiments, the regenerating gas in line 264 can be imported from a source located off site from the steam cracker 116. In some embodiments, at least a portion of the desorb effluent can be combined with the hydrocarbon feed in line 113, the heated hydrocarbon feed in line 118, and/or the overhead inline 124 and introduced into the steam cracker 116. The carbonyl sulfide removal bed 240 can also be periodically regenerated in a similar manner as the carbonyl sulfide removal bed 263.

In some embodiments, the compressed gas in line 207, the treated gas in line 211, and/or the upgraded gas in line 217 may include water vapor. At least a portion of the water can be removed by condensing, by sorption, or otherwise removing at least a portion of the water and separating and a dried gas therefrom. In some embodiments, at least a portion of the compressed gas in line 207, the treated gas in line 211, the upgraded gas in line 217, or any other gaseous stream can be introduced into a dehydrator to remove at least a portion of the water vapor to provide a dried stream. The dehydrator can be located at any suitable position within the recovery facility 155. For example, the overhead stream in line 142 could be introduced into the dehydrator with the dried stream being introduced into the compressor 260. In another example, the upgraded combined gas in line 217 could be introduced into the dehydrator with the dried stream being introduced into the separation stage 219. In addition to or in lieu of the dehydrator, water can be removed via one or more other ways such as during compression of the overhead in line 222 via the compressor 260.

The stream in line 281 can be introduced into separation stage 282 that can separate therefrom at least (i) ethylene via line 161 and (ii) ethane via line 160. The ethane can be recycled to the steam cracker 116 (FIG. 1) for cracking, used in a refinery process, used as or as a component of the regeneration gas in line 103 (FIG. 1) and/or in line 264, and/or recovered as a product. Additional separations can optionally be carried out. For example, a separator 287 can be used to separate the stream in line 271 into (i) the methane via line 162 and (ii) molecular hydrogen via line 163. In some embodiments, at least a portion of the separated methane in line 162 can be used as a fuel gas, recycled to the steam cracker 116 for the production of synthesis gas and molecular hydrogen, and/or used as or as a component of the regeneration gas in line 103 (FIG. 1) and/or in line 264. In some embodiments, at least a portion of the molecular hydrogen in line 163 can be recycled to a hydroprocessing stage, e.g., for use in upgrading in the hydrogenation unit 235.

Listing of Embodiments

This disclosure may further include the following non-limiting embodiments.

A1. A process for upgrading a hydrocarbon, comprising: contacting a gas comprising one or more $C_1$-$C_4$ hydrocarbons and carbonyl sulfide with a sorbent under conditions sufficient to cause at least a portion of the carbonyl sulfide to sorb onto the sorbent to produce a treated gas lean in carbonyl sulfide and a sorbent rich in carbonyl sulfide; contacting the sorbent rich in carbonyl sulfide with a regenerating gas comprising molecular hydrogen, one or more $C_1$-$C_4$ hydrocarbons, or a mixture thereof to produce a regenerated sorbent and a desorb effluent comprising a sulfur-based contaminant; introducing at least a portion of the desorb effluent into a pyrolysis zone of a steam cracker, and recovering a steam cracker effluent from the pyrolysis zone.

A2. The process of A1, wherein, during the introduction of the desorb effluent into the pyrolysis zone, the steam cracker effluent comprises sulfur obtained from the desorb effluent at least partly as hydrogen sulfide.

A3. The process of A1 or A2, further comprising: separating a process gas comprising the hydrogen sulfide from the steam cracker effluent; and contacting at least a portion of the process gas with an aqueous amine to produce a spent aqueous amine and a process gas lean in hydrogen sulfide.

A4. The process of any of A1 to A3, wherein the regenerating gas comprises the process gas lean in hydrogen sulfide or a fraction thereof.

A5. The process of any of A1 to A4, further comprising: separating a process gas comprising the hydrogen sulfide from the steam cracker effluent; and contacting at least a portion of the process gas with an aqueous inorganic base to produce a spent aqueous inorganic base and a process gas lean in hydrogen sulfide.

A6. The process of A5, wherein the regenerating gas comprises the process gas lean in hydrogen sulfide or a fraction thereof.

A7. The process of any of A1 to A6, wherein the gas comprising the one or more $C_1$-$C_4$ hydrocarbons and carbonyl sulfide comprises a refinery gas recovered from a refinery upgrading process comprising at least one of: fluid catalytic cracking, coking, hydrocracking, hydrotreating, isomerization, reforming, decoking, hydrocarbon combustion, hydrocarbon distillation, hydrocarbon unsaturation, and hydrocarbon saturation.

A8. The process of any of A1 to A7, wherein the gas comprising the one or more $C_1$-$C_4$ hydrocarbons and carbonyl sulfide is recovered from the steam cracker effluent.

A9. The process of any of A1 to A8, wherein the regenerating gas comprises the treated gas or a fraction thereof.

A10. The process of any of A1 to A9, wherein the regenerating gas is imported from a source located off site from the steam cracker.

A11. The process of any of A1 to A10, wherein the regenerating gas comprises molecular hydrogen, one or more $C_1$-$C_4$ alkanes, or a mixture thereof.

A12. The process of any of A1 to A11, wherein the regenerating gas comprises molecular hydrogen, one or more $C_1$-$C_4$ alkanes, or a mixture thereof, and wherein the regenerating gas comprises <10 mol %, <5 mol %, <3 mol %, or <1 mol % of any alkenes.

A13. The process of any of A1 to A12, wherein the one or more $C_1$-$C_4$ hydrocarbons in the gas comprising the one or more $C_1$-$C_4$ hydrocarbons and the carbonyl sulfide comprise a mixture of alkanes and alkenes, and wherein the regenerating gas comprises the treated gas or a fraction thereof.

A14. The process of any of A1 to A13, wherein the regenerating gas comprises ≥50 mol % (e.g., ≥60 mol %, ≥70 mol %, ≥80 mol %, ≥90 mol %, ≥95 mol %) of one or more $C_1$-$C_4$ alkanes or a mixture thereof, based on the total moles in the regenerating gas.

A15. The process of any of A1 to A14, wherein the regenerating gas comprises ≥50 mol % (e.g., ≥60 mol %, ≥70 mol %, ≥80 mol %, ≥90 mol %, ≥95 mol %) of one or more $C_2$-$C_4$ alkanes or a mixture thereof, based on the total moles in the regenerating gas.

A16. The process of any of A1 to A15, wherein sulfur-based contaminant in the desorb effluent comprises hydrogen sulfide, carbonyl sulfide, a mercaptan, or a mixture thereof.

A17. The process of any of A1 to A16, wherein the regenerating gas is at a temperature of about 90° C. to about 315° C. when contacted with the sorbent rich in carbonyl sulfide.

A18. The process of any of A1 to A17, wherein the sorbent comprises an adsorbent.

A19. The process of any of A1 to A18, further comprising contacting additional gas comprising the one or more $C_1$-$C_4$ hydrocarbons and carbonyl sulfide with the regenerated sorbent under conditions sufficient to cause at least a portion of the carbonyl sulfide to sorb onto the regenerated sorbent to produce additional treated gas lean in carbonyl sulfide and additional sorbent rich in carbonyl sulfide.

A20. The process of any of A1 to A19, further comprising flowing at least a portion of the desorb effluent through a knockout drum, a filter, a coalescer, or a combination thereof to remove at least a portion of any fines present in the desorb effluent prior to introducing at least a portion of the desorb effluent into the pyrolysis zone.

B1. A process for upgrading a hydrocarbon, comprising: contacting a gas comprising one or more $C_1$-$C_4$ hydrocarbons and carbonyl sulfide with a sorbent under conditions sufficient to cause at least a portion of the carbonyl sulfide to sorb onto the sorbent to produce a treated gas lean in carbonyl sulfide and a sorbent rich in carbonyl sulfide; contacting the sorbent rich in carbonyl sulfide with a regenerating gas comprising one or more $C_1$-$C_4$ hydrocarbons to produce a regenerated sorbent and a desorb effluent comprising a sulfur-based contaminant; combusting at least a portion of the desorb effluent in the presence of an oxidant to produce a combustion effluent comprising one or more sulfur oxides; and contacting at least a portion of the combustion effluent with an aqueous inorganic base to produce an exhaust effluent lean in sulfur-based contaminants and a spent aqueous inorganic base, wherein: the gas comprising the one or more $C_1$-$C_4$ hydrocarbons and carbonyl sulfide is separated from a steam cracker effluent, heat produced during combustion of the desorb effluent heats a radiant section of a steam cracker furnace, or a combination thereof.

B2. The process of B1, further comprising contacting additional gas comprising the one or more $C_1$-$C_4$ hydrocarbons and carbonyl sulfide with the regenerated sorbent under conditions sufficient to cause at least a portion of the carbonyl sulfide to sorb onto the regenerated sorbent to produce additional treated gas lean in carbonyl sulfide and additional sorbent rich in carbonyl sulfide.

B3. The process of B1 or B2, further comprising flowing at least a portion of the desorb effluent through a knockout drum, a filter, a coalescer, or a combination thereof to remove at least a portion of any fines present in the desorb effluent prior to combusting the desorb effluent.

B4. The process of any of B1 to B3, wherein the sulfur-based contaminant comprises hydrogen sulfide, carbonyl sulfide, a mercaptan, or a mixture thereof.

C1. A process for upgrading a hydrocarbon, comprising: contacting a gas comprising one or more $C_1$-$C_4$ hydrocarbons and carbonyl sulfide with a sorbent under conditions sufficient to cause at least a portion of the carbonyl sulfide to sorb onto the sorbent to produce a treated gas lean in carbonyl sulfide and a sorbent rich in carbonyl sulfide; contacting the sorbent rich in carbonyl sulfide with a regenerating gas comprising one or more $C_1$-$C_4$ hydrocarbons to produce a regenerated sorbent and a desorb effluent comprising hydrogen sulfide, carbonyl sulfide, one or more mercaptans, or a mixture thereof; combining at least a portion of the desorb effluent with a process gas separated from a steam cracker effluent to produce a mixed effluent; and contacting at least a portion of the mixed effluent with an basic aqueous medium under conditions sufficient to remove at least a portion of any hydrogen sulfide, at least a portion of any carbonyl sulfide, at least a portion of any one or more mercaptans, or a combination thereof to produce a process water rich in sulfur and a treated effluent lean in hydrogen sulfide, carbonyl sulfide, the one or more mercaptans, or a combination thereof.

C2. The process of C1, wherein the regenerating gas is separated from the treated effluent.

C3. The process of C1 or C2, wherein the gas comprising the one or more $C_1$-$C_4$ hydrocarbons and carbonyl sulfide comprises a refinery gas recovered from a refinery upgrading process comprising one or more of: fluid catalytic cracking, coking, hydrocracking, hydrotreating, isomerization, reforming, hydrocarbon unsaturation, and hydrocarbon saturation.

D1. A process for upgrading a hydrocarbon, comprising: contacting a gas comprising one or more $C_1$-$C_4$ hydrocarbons, carbonyl sulfide, and acetylene with a sorbent under conditions sufficient to cause at least a portion of the carbonyl sulfide to sorb onto the sorbent to produce a treated gas lean in carbonyl sulfide and a sorbent rich in carbonyl sulfide, wherein the gas is separated from a stream cracker effluent; contacting the sorbent rich in carbonyl sulfide with a regenerating gas comprising one or more $C_1$-$C_4$ hydrocarbons to produce a regenerated sorbent and a desorb effluent comprising hydrogen sulfide, carbonyl sulfide, one or more mercaptans, or a mixture thereof; contacting at least a portion of the desorb effluent with a disposable medium to produce a disposable medium rich in hydrogen sulfide, rich in carbonyl sulfide, rich in one or more mercaptans, or rich in a mixture thereof; and disposing of at least a portion of the hydrogen sulfide rich disposable medium.

D2. The process of D1, wherein the gas further comprises a refinery gas recovered from a refinery upgrading process comprising one or more of: fluid catalytic cracking, coking, hydrocracking, hydrotreating, isomerization, reforming, hydrocarbon unsaturation, and hydrocarbon saturation.

D3. The process of D1 or D2, wherein the desorb effluent is substantially free of acetylene.

E1. A processes for upgrading a hydrocarbon, comprising: contacting a gas comprising one or more $C_1$-$C_4$ hydrocarbons and carbonyl sulfide with a sorbent under conditions sufficient to cause at least a portion of the carbonyl sulfide to sorb onto the sorbent to produce a first gas lean in carbonyl sulfide and a first sorbent rich in carbonyl sulfide; contacting the sorbent rich in carbonyl sulfide with a first regenerating gas comprising one or more $C_1$-$C_4$ hydrocarbons to produce a first regenerated sorbent and a first desorb effluent comprising one or more sulfur-based contaminants; and combusting at least a portion of the desorb effluent in the presence of an oxidant to produce a combustion effluent, wherein at least a portion of the combustion effluent heats a radiant section of a steam cracker furnace, a boiler, or a combination thereof; exhausting the combustion gas to the atmosphere; determining a reduction in sulfur-based contaminants is needed; contacting additional gas comprising the one or more $C_1$-$C_4$ hydrocarbons and carbonyl sulfide with the regenerated sorbent under conditions sufficient to cause at least a portion of the carbonyl sulfide to sorb onto the regenerated sorbent to produce a second gas lean in carbonyl sulfide and a second sorbent rich in carbonyl sulfide; contacting the second carbonyl sulfide rich sorbent with a second regenerating gas comprising one or more $C_1$-$C_4$ hydrocarbons to produce a second regenerated sorbent and a second desorb effluent comprising one or more sulfur-based contaminants; and introducing at least a portion of the desorb effluent into a pyrolysis zone of a steam cracker.

E2. The process of E1, wherein the first regenerating gas is a tail gas comprising ≤5 mol % of $C_2$-$C_4$ hydrocarbons, and wherein the second regenerating gas comprises ≥50 mol % of $C_2$-$C_4$ hydrocarbons.

E3. The process of E1 or E2, wherein at least a portion of the combustion effluent heats a boiler, a furnace, or other combustion device.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for upgrading a hydrocarbon, comprising:

contacting a gas comprising one or more $C_1$-$C_4$ hydrocarbons and carbonyl sulfide with a sorbent under conditions sufficient to cause at least a portion of the carbonyl sulfide to sorb onto the sorbent to produce a treated gas lean in carbonyl sulfide and a sorbent rich in carbonyl sulfide;

contacting the sorbent rich in carbonyl sulfide with a regenerating gas comprising molecular hydrogen, one or more $C_1$-$C_4$ hydrocarbons, or a mixture thereof to produce a regenerated sorbent and a desorb effluent comprising a sulfur-based contaminant;

introducing at least a portion of the desorb effluent into a pyrolysis zone of a steam cracker; and recovering a steam cracker effluent from the pyrolysis zone.

2. The process of claim 1, wherein, during the introduction of the desorb effluent into the pyrolysis zone, the steam cracker effluent comprises sulfur obtained from the desorb effluent at least partly as hydrogen sulfide.

3. The process of claim 2, further comprising:

separating a process gas comprising the hydrogen sulfide from the steam cracker effluent; and contacting at least a portion the process gas with an aqueous amine to produce a spent aqueous amine and a process gas lean in hydrogen sulfide.

4. The process of claim 2, further comprising:

separating a process gas comprising the hydrogen sulfide from the steam cracker effluent; and contacting at least a portion of the process gas with an aqueous inorganic base to produce a spent aqueous inorganic base and a process gas lean in hydrogen sulfide.

5. The process of claim 2, wherein the regenerating gas comprises a portion of the process gas lean in hydrogen sulfide or a fraction of the process gas lean in hydrogen sulfide thereof.

6. The process of claim 1, wherein the gas comprising the one or more $C_1$-$C_4$ hydrocarbons and carbonyl sulfide comprises a refinery gas recovered from a refinery upgrading process comprising at least one of: fluid catalytic cracking, coking, hydrocracking, hydrotreating, isomerization, reforming, decoking, hydrocarbon combustion, hydrocarbon distillation, hydrocarbon unsaturation, and hydrocarbon saturation.

7. The process of claim 1, wherein the gas comprising the one or more $C_1$-$C_4$ hydrocarbons and carbonyl sulfide is recovered from the steam cracker effluent.

8. The process of claim 1, wherein the regenerating gas comprises the treated gas or a fraction thereof.

9. The process of claim 1, wherein at least a portion of the regenerating gas is imported from a source located off site from the steam cracker.

10. The process of claim 1, wherein the regenerating gas comprises molecular hydrogen, one or more $C_1$-$C_4$ alkanes, or a mixture thereof.

11. The process of claim 10, wherein the regenerating gas comprises $<10$ mol % of any alkenes, based on the total moles in the regenerating gas.

12. The process of claim 1, wherein the one or more $C_1$-$C_4$ hydrocarbons in the gas comprising the one or more $C_1$-$C_4$ hydrocarbons and the carbonyl sulfide comprise a mixture of alkanes and alkenes, and wherein the regenerating gas comprises the treated gas or a fraction thereof.

13. The process of claim 1, wherein the regenerating gas comprises $\geq 50$ mol % of one or more $C_1$-$C_4$ alkanes or a mixture thereof, based on the total moles in the regenerating gas.

14. The process of claim 1, wherein sulfur-based contaminant in the desorb effluent comprises hydrogen sulfide, carbonyl sulfide, a mercaptan, or a mixture thereof.

15. The process of claim 1, wherein the regenerating gas is at a temperature of about 90° C. to about 315° C. when contacted with the sorbent rich in carbonyl sulfide.

16. The process of claim 1, further comprising flowing at least a portion of the desorb effluent through a knockout drum, a filter, a coalescer, or a combination thereof to remove at least a portion of any fines present in the desorb effluent prior to introducing the at least a portion of the desorb effluent into the pyrolysis zone.

* * * * *